United States Patent
Rawes et al.

(10) Patent No.: US 6,345,539 B1
(45) Date of Patent: Feb. 12, 2002

(54) RELATING TO FLOW MEASUREMENT

(75) Inventors: William Leslie Hodges Rawes, Bedford; Michael Langley Sanderson, Milton Keynes, both of (GB)

(73) Assignee: Cranfield University (GB)

( * ) Notice: Subject to any disclaimer, the term of this patent is extended or adjusted under 35 U.S.C. 154(b) by 0 days.

(21) Appl. No.: 09/294,645

(22) Filed: Apr. 19, 1999

Related U.S. Application Data

(63) Continuation of application No. PCT/GB97/02867, filed on Oct. 17, 1997.

(30) Foreign Application Priority Data

Oct. 19, 1996 (GB) .............................................. 9621854

(51) Int. Cl.$^7$ ................................................. G01F 1/66
(52) U.S. Cl. ................................................. 73/861.27
(58) Field of Search ........................ 73/861.27, 861.18, 73/861.29, 194

(56) References Cited

U.S. PATENT DOCUMENTS 4,103,551 A * 8/1978 Lynnworth .................... 73/194
4,982,383 A * 1/1991 Sims et al. .................... 367/89

FOREIGN PATENT DOCUMENTS

| EP | 0268314 | 5/1988 |
|---|---|---|
| EP | 0639776 | 2/1995 |
| FR | 2356127 | 1/1978 |
| WO | 9420822 | 9/1994 |
| WO | 9519559 | 7/1995 |

OTHER PUBLICATIONS

Patent Abstracts of Japan vol. 096. No. 005, May 31, 1996, JP 08 014974 A (Kubota Corp) Jan. 19, 1996—see Abstract; Figures 1–4.

* cited by examiner

*Primary Examiner*—Benjamin R. Fuller
*Assistant Examiner*—Jewel V. Thompson
(74) *Attorney, Agent, or Firm*—Baker Botts L.L.P.

(57) ABSTRACT

An ultrasonic insertion flowmeter (100) is disclosed having a probe (101) which is adapted to be inserted into a duct, the probe having at least first and second ultrasonic transducer means, the probe (101) being adapted to measure the transit time difference of an ultrasonic pulse along a first path and a second path, the difference in transit time for signals along the two paths enabling the flow rate to be measured. Preferably, the probe takes measurements in both the forward and reverse directions along each path, and is adapted to rotate after initial insertion from an insertion position to a measurement position, whereafter the probe (101) may be drawn up against a wall of the duct so that alignment of the probe within the duct is readily achieved.

41 Claims, 4 Drawing Sheets

RELATING TO FLOW MEASUREMENT

This a continuation of copending International application No. PCT/GB97/02867 field Oct. 17, 1997.

This invention relates to improvements in methods and apparatus for measuring the flow of fluid in a duct. In particular, although not exclusively, it relates to insertion monitoring, in which a flow measurement probe is inserted through an opening in a wall of a duct, such as a pipe.

It is becoming increasingly common place to install fixed flow rate monitoring equipment into a duct network. An example is the provision of water meters or gas meters in the domestic utility companies pipe networks. By providing a separate meter for each household, the flow of fluid and hence volume of fluid used over time by each household can be calculated.

Because fixed meters can by their very nature not be readily removed without considerable difficulty, it has been found that the only reliable way to test the integrity and calibration of the measuring devices in the meter is to take independent on-line measurements of flow rate. These measurements can then be compared with the readings from the fixed meters. Typically, the on-line measurements are obtained by using data from insertion flow measurement devices which are inserted through an opening in the wall of the duct. In some applications, the insertion flow measuring devices are removed following testing. However, it is also possible to leave the device in the duct for a longer period, say 12 or 24 hours, or perhaps permanently.

At present, the use of the insertion monitoring techniques that exist in the state of the art prior to the present invention is restricted by financial and practical problems. In one known insertion metering device, a probe is inserted into the duct through a hole or valve opening in the duct wall. The probe comprises a rod which carries a turbine or electromagnetic sensing element on its tip. The sensing element can take a point measurement indicative of the flow in a part of the pipe at a point in time. However, because the flow in the pipe is unknown, (varying both in profile across the cross-section of the pipe and with time) several measurements must be taken at different points in the cross-section of the duct and at different times. An average can then be built up which would approximate the average flow rate. Its accuracy is limited by the difficulty in aligning the sensing element correctly along the axis of the duct.

In order to obtain reasonably accurate results, the prior art insertion technique requires that measurements are taken at several positions across at least one diameter of the pipe. However, it has been found that in practice where flow profiles are distorted that it is necessary to measure across more than one diameter (i.e. two orthogonal diameters) to provide sufficiently accurate results which can be used for calibration. This introduces severe problems when the duct system is installed underground, as it requires that a large chamber must be excavated around the pipe in order to allow access for separate circumferentially spaced holes in the pipe to be made to allow the orthogonal measurements to be made. To make the chambers can be both expensive and time consuming.

A further problem with the prior art technique is that the surface area of the rod which supports the sensing element forms a variable blockage in the duct as the element is moved across the diameter. This blockage affects the results by altering the flow profile in the duct and increases turbulence. Furthermore, the process of taking the many measurements required is subject to variability due to the often difficult operating conditions in which the measurements must be made. Often, the insertion probe operator may be working in a water filled, muddy pit which makes it difficult to obtain the various readings with any certain degree of accuracy. Different operators can get different results. It is thus desirable to de-skill the measurement process.

According to a first aspect of the invention we provide an ultrasonic insertion flow meter having a probe adapted to be inserted into a duct, said ultrasonic probe having ultrasound transducers and being adapted to perform at a single site of introduction into the duct a first ultrasonic path interrogation having a component of travel of ultrasound in a first direction that is, in use, an axial direction relative to the region of the duct where the device is inserted, and also adapted to perform a second ultrasound path interrogation having a component of travel of ultrasound in a second axial direction opposite to said first axial direction, the arrangement being such that a comparison of the signal associated with ultrasound travel in one axial direction with that of the signal associated with ultrasound travel in the opposite axial direction enables the flow rate of fluid in said duct to be estimated.

Time of flight measurements of ultrasound are effected by the flow rate and the insertion meter uses a transit time ultrasonic measurement to evaluate the flow rate.

The meter has an ultrasound emitter and an ultrasound detector.

These may be different transducers, but we prefer to use the same transducer to emit and detect. It may be possible to use appropriate reflectors spaced in use axially (relative to the duct) of a combined emitter/receiver transducer.

There may be a first emitter and receiver pair spaced apart by spacing means. There may be a second emitter and receiver pair, which may be spaced apart by the same spacing means.

Preferably the probe is adapted to measure the transit time difference of an ultrasonic pulse in the forward and reverse direction of a first interrogation path and also the transit time difference in the forward and reverse directions of a second, different, interrogation path. The average of the transit time difference in forward and reverse directions of ultrasound travel along the different interrogation paths gives a representation of the flow rate of fluid in the duct. The difference between the forward and reverse transit times of the different interrogation paths may be indicative of the swirl of fluid in the duct.

Because the ultrasound path has at least two path environments and because the ultrasound does travel through the fluid in the pipe axially (at last with an axial component) rather than a single point measurement of flow being obtained as in the prior art, the fluid flow at man different points on the ultrasound path effects the signal that i s measured. This provides a degree of in-built averaging or integration which eliminates the need to obtain many measurements at different points in the cross-section of the duct. This in turn means that the measurement process is quicker and requires less skill.

A first pair of ultrasonic transducers may be provided on one transducer mounting and may be spaced from a second pair of ultrasonic transducers provided on a second transducer mounting. In this case, the first and second pairs of transducers may communicate along two different geometric paths. The first pair of transducers may comprise the emitter of one emitter/receiver pair and the receiver of another emitter/receiver pair. The second pair of transducers may comprise the receiver of said one emitter/receiver pair and the transmitter of said emitter/receiver pair.

Preferably, the insertion meter is adapted to use the reflection of ultrasound off the sidewalls of the duct to create the first ultrasonic path interrogation and/or the second ultrasonic path interrogation. The ultrasonic paths may be beams of ultrasound. There may be more than one reflection off the duct walls as the ultrasound travels from its emitter to its receiver.

The insertion flow meter probe is adapted to take the first and second ultrasonic path interrogations whilst it is stationary.

The first emitter/receiver pair is preferably adapted to be spaced axially of the duct in use, preferably in a direction parallel to the central longitudinal axis of the duct. Similarly, the second emitter/receiver pair is preferably adapted to be spaced axially of the duct in use, preferably in a direction that is parallel to the axis of the duct.

Preferably the or each emitter is adapted to be adjacent a wall of the duct in use. Preferably the or each receiver is adapted to be adjacent a wall of the duct, most preferably the same wall as the emitter(s).

The emitter/receiver of a first pair may be spaced emitter-to-receiver in one axial direction and the emitter/receiver of the second pair may be spaced emitter-to-receiver in the opposite direction.

Two beams of ultrasound may be used to interrogate the flow in the duct, one beam when viewed along the axis of the duct having reflections having a clockwise sense of rotation about the axis, and the other beam when viewed along the same direction having reflections in an anticlockwise sense of rotation about the axis. This enables a comparison of the two signals to have a reduced or eliminated sensitivity to swirl of fluid in the duct.

Preferably the flow meter comprises an insertion means adapted to support the probe means and adapted to move the probe means in use relative to the duct between a first position in which said probe means can be inserted into the duct and a second position in which flow measurements can be made.

The probe means preferably has a greater dimension parallel to the axis of the duct in its second position than it does in its first position.

Preferably, in the first position, the probe means is oriented so that the first and second transducers are spaced apart substantially orthogonal to the axis of the duct. In the second position the probe means is preferably oriented so that the pairs of transducers are spaced apart substantially axially along the duct. This is advantageous as it allows for the orifice in the duct through which the probe means is inserted into the duct to be of a small size. After insertion, the probe means can then be moved to take up its measurement position. The probe means is preferably swung from its introduction position to its measurement position.

The spacing means between the first and second emitter/receiver pairs of transducers may be varied. Varying the spacing between the first and second transducers is advantageous as it allows the probe to be tailored for use with ducts of varying diameters (i.e. a large spacing could be used for measurements in large diameter ducts).

Preferably the probe means is hingedly attached to the insertion means so that the probe means can be moved angularly between the first position and the second position. The probe means may be hinged at one end. Alternatively, it may be hinged at any point along its length (e.g. the middle) so that, say, one of the pairs of transducers lies on either side of the hinge.

The flow measuring apparatus may further comprise signal processing means adapted to process output signals from the emitters and receivers and to monitor the transit time for ultrasonic signals passing along two different paths.

Most preferably, the signal processing means is adapted to compare the transit times of signals in the forward and reverse directions along the duct, i.e. signals from the first emitter/receiver pair and signals from the second emitter/receiver pair along each of the two paths.

Most preferably, the transducers are arranged so that in the second position of the probe means, the signals along each path are reflected twice from the wall of the duct, so that, when viewed along the axis of the duct, an angle of about 60 degrees is subtended between the incident and reflected signals at the point of reflection. This geometry has been found to be advantageous because it reduces the effect of the flow profile in the duct on flow measurements.

As previously mentioned, it is possible to provide a flow measuring apparatus which is adapted to compare the transit time for ultrasonic signals propagating in both directions along each of the two different paths. This comparison can be used to provide information about the amount of swirl of the flowing fluid as each path may be differently affected by the same amount of swirl.

In an alternative arrangement, the probe means may comprise first and second transducers which are mounted back to back between a pair of conic reflectors which are adapted so that the reflectors reflect signals from the first transducer to the second transducer and vice versa. The spacing of the reflectors relative to the transducers may be altered to allow the probe to operate with different duct sizes. Alternatively, the spacing between the reflectors and the transducer may be fixed, whilst the spacing between the first and second transducers could be varied.

According to another aspect of the invention we provide a method of measuring the flow rate of a fluid in a duct comprising the steps of:

inserting an insertion flow meter into a duct;

conducting a forward direction ultrasonic transit time test with a component of travel of the ultrasound in the axial direction of flow of the fluid in the duct;

conducting a reverse direction ultrasonic transit time test with a component of travel of the ultrasound in the direction opposite to the axial direction of flow of fluid in the duct;

comparing the results of the forward and reverse transit time tests to give a result indicative of the fluid flow rate.

Preferably the forward and reverse tests are performed between the same pair of transducers which act as emitter/receiver for the forward test and receiver/emitter for the reverse test.

Preferably a second forward direction test and/or a second reverse direction test is/are performed along a different ultrasound travel path than the first forward direction and reverse direction tests, and the result(s) from the second test(s) compared with those of the first travel path test to give a figure indicative of swirl of the fluid in the duct.

Preferably the method comprises performing the test with a probe that is in the same place for all of the tests.

Preferably the method comprises holding the probe to a wall of the duct, preferably the upper wall.

Preferably the method comprises orientating the probe in the duct by looking at the signals received and adjusting the orientation until a desired signal or comparison of signals is received.

Preferably the method comprises introducing the probe into the duct with the probe having a smaller projected length in the axial direction to the duct in comparison to its axial length in a position of use to which is manipulated prior to the tests being performed. The probe may be introduced generally radially to the duct used then moved to extend generally axially.

The method may comprise using an ultrasonic probe comprising at least one first ultrasonic transducer and at least one second ultrasonic transducer spaced apart from the first transducer, the first and second transducers being in a first position in which they are spaced apart substantially orthogonal to the duct axis when they are introduced into the duct, > moving the probe assembly from the first position to a second position in which the first and second transducers are spaced apart substantially along an axis of the duct;
>
> measuring the transit time for pulses of ultrasound transmitted between the first and second transducers and vice versa along one or more paths; and
>
> comparing the transit time for pulses propagating between the first and the second transducers to the transit time for pulses propagating between the second and the first transducers, the difference being indicative of the rate of flow of fluid in the duct.

Preferably, the probe assembly is rotatable between the first and second positions. Preferably, a pair of first transducers and a pair of second transducers is provided. Most preferably, the first and second pairs of transducers communicate along two different paths.

The method may further comprise the additional step of moving the probe assembly into contact with the upper surface of the duct, i.e. the surface adjacent the entry hole via which the probe is inserted. This is advantageous in that it reduces the area of the probe assembly presented to the fluid.

An advantageous feature of the invention is that by varying the alignment of the probe slightly relative to the axis of the duct and measuring the change in transit time of the signals produced by the transducers, it is possible to fine tune the position of the probe assembly so that it is correctly aligned with the axis of the duct. This feature, in addition to the self alignment obtained when the probe is pulled up against the duct wall allows excellent alignment of the probe relative to the axis to be obtained.

The method may further comprise the steps of adjusting the spacing between the first and second pairs of transducers so as to allow the probe assembly to operate in a variety of diameters of duct. This could be done before inserting the probe, or perhaps whilst it is inserted in the duct, or after insertion.

Additionally, the method may comprise the further step of comparing the transit times for signals propagating along each of the two paths in order to measure the swirl of fluid in the duct.

The method may comprise the extra step of measuring the duct diameter by monitoring transit time and/or signal amplitude (which is dependent on duct internal diameter and speed of sound in the fluid) in order to obtain an accurate measure of the duct diameter, and/or transducer alignment. This can enable the accurate alignment of the probe, or could be used to produce a signal which would provide feedback to the operator about probe alignment.

In accordance with a third aspect of the invention, we provide a method of checking a fixed flow meter by using an ultrasonic insertion flow meter in accordance with the first aspect of the present invention. The method may therefore comprise obtaining flow rate measurements by inserting the flow meter into a duct and comparing these measurements to the measurements obtained by the fixed flow rate meter in order to check the calibration or correct operation of the fixed flow meter.

There will now be described, by way of example only, some embodiments of the present invention with reference to the accompanying drawings in which.

FIGS. 1 to 4 illustrate a first preferred embodiment of an insertion flow meter assembly in accordance with the present invention. The insertion flow meter 100 comprises probe means 101 attached to insertion means 102 adapted to introduce the probe means into the pipe. For convenience of description, the insertion means 102 will be described first, followed by a description of the probe means 101 and an explanation of the operation of the whole assembly.

Figure 1A:
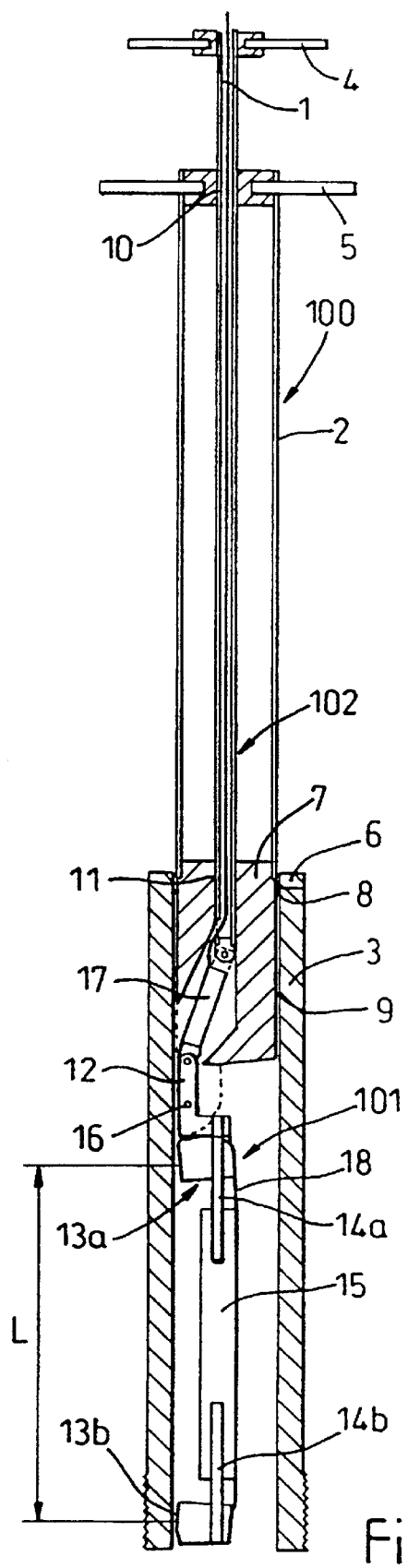
FIG. 1a shows an insertion flow meter and its insertion means and probe assembly in cross-section.

As shown in FIG. 1a, the insertion flow meter 100 has insertion means 102 comprising a thin elongate rod 1 which is slidably engaged at a lower end within an annular guide means 7 via 'O' rings 10 and 11 and supports a handle 4 at its opposing end. A second elongate tubular element 2 having an internal diameter greater than the external diameter of the rod 1 is arranged concentrically with the rod 1 and is fixed at its lower end to the guide means 7 and carries a handle 5 at its upper end. The guide means 7 is itself slidably engaged via 'O' ring seals 8 and 9 within an elongate tubular casing member 3.

The lower end of the rod 1 is connected via a hinged assembly to the probe means 101 (or probe assembly 101). The hinged assembly comprises a link member 17 which is pivotally connected at its upper end to the rod 1 and at its lower end is pivotally connected to a first portion 12 of the probe means. The first portion 12 is pivotally connected to the guide means 7 via a hinge pin 16 so that sliding movement of the rod 1 within the guide means 7 causes the first portion 12 to rotate relative to the outer casing 3. In addition, the hinge pin 16 acting upon the link member 17 prevents the lower end of rod 1 from being fully withdrawn from the guide means 7.

Before the probe means 101 can be inserted into a duct using the insertion means described hereinbefore, the rod 1 is extracted from the guide means 7 by retracting handle 4 as far as is possible. This causes the probe assembly which is attached to the first portion 12 to lie axially in line with the rod 1. The second tube 2 is then withdrawn from the outer casing 3 until only the guide means 7 lies within the outer casing 3. The probe assembly in this position is then fully protected within the outer casing 3, and the probe assembly is ready for inserting into the duct.

In order to insert the probe assembly into the duct for measuring flow, the assembly is moved into its initial position of use as described in the preceding paragraph and the outer casing 3 is screwed onto a boss valve (shown in FIG. 4 as 22) using a screw thread provided on the lower end of the casing 3. The valve 22 can then be opened to place the inside of the outer casing 3 into connection with the inside of the duct. Fluid cannot escape because of the 'O' ring seals 8,9,10 and 11.

If a boss valve is not present on the pipe, one could be welded in place in situ or some other suitable opening in the duct wall could be made.

The handle 5 is then depressed to move the probe assembly downwards within the outer casing 3, through the opening in the wall of the duct and into the duct itself until the tip of the probe contacts the opposing wall of the duct. This provides an indication to the operator that the probe has fully entered the duct. The handle 5 is then pulled upwards slightly to raise the probe assembly slightly from the bottom of the duct (say 0.5 cm). The handle is then rotated so that it is aligned with the axis of the duct. Because a direct relationship exists between the axis of the handle and the plane in which the probe assembly is hinged, this allows the operator to tell that the probe assembly is aligned in approximately the desired orientation relative to the duct. Finally, the handle 4 is depressed so that the rod 1 is moved relative to the guide means 7 causing the probe assembly which is rigidly fixed to the pivot member 12 to rotate about the pivot pin 16 into a position in which it is substantially orthogonal to the outer casing 3 and lies substantially along the axis of the duct. The handle 5 can then be further moved upwards to bring the probe assembly into contact with the upper face of the duct, which helps to self-align the probe assembly with the axis of the duct. This also helps to locate the probe assembly positively, and ensures that the probe assembly has as little effect as possible on the fluid flow. Finally, the probe can be locked in place using a clamp 6 fixed to the outer casing 3 which grips the tube 2.

It can be seen, therefore, that by arranging for the probe assembly to pivot from its insertion position to its position of use, the size of the insertion opening can be kept to a minimum whilst the spacing of the transducers can be optimised. Furthermore, because the probe assembly is in contact with the upper wall, only a small profile is presented to the oncoming flow of fluid and so minimal disturbance of the flow is produced.

The preferred embodiment of the probe assembly and the operation of the probe assembly in obtaining measurements will now be described, again with reference to FIGS. 1a and 1b of the drawings.

The probe assembly comprises an elongate spacer element 15 connected at one end via a first threaded adjuster rod 14a to the pivot member 12. A second threaded adjuster rod 14b is provided at the opposing end of the spacer element 15. A first pair 13a of transducers 19 are mounted on the pivot member 12 adjacent the rod 14a, and a second pair 13b of transducers 19 is supported by the free end of the second adjuster rod 14b. The axial spacing between the first and second pairs of transducers 19 is therefore dependent on the length of the spacer 15 and the length of the adjuster rods 14a, 14b protruding from the spacer.

Figure 1B:
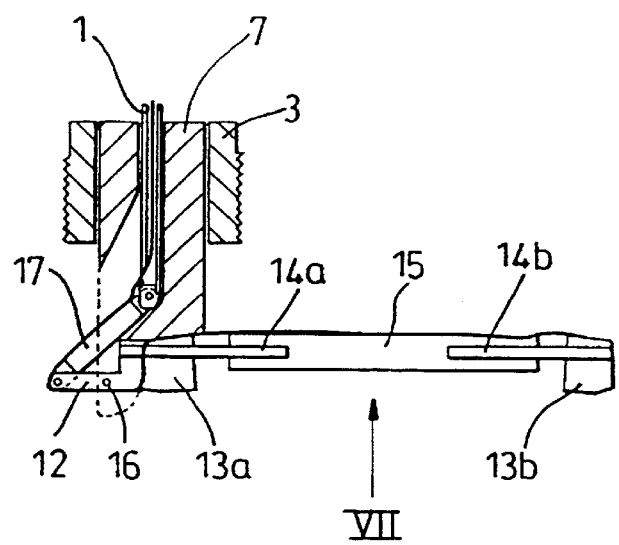
FIG. 1b is an enlarged view of the probe assembly of FIG. 1a in which the probe assembly has been rotated relative to the insertion means.

In the embodiment shown in FIG. 1b, the adjusters 14 can be screwed into and out of the spacer 15 to vary the spacing L between the two pairs 13a,13b of transducers 19.

The choice of length L between the first transducers 13a and second transducers 13b is dependent upon the diameter of the pipe and orientation of the transducers. In use, signals are transmitted along paths between the transducers, and in order for the first and second pairs of transducers to communicate when used in, for example, a circular pipe, the relation $L = \sqrt{3} \tan \alpha\, D$ must hold, where D is the pipe diameter and $\alpha$ is the angle of inclination of the acoustic paths with the pipe diameter. This relationship arises because of the angle of reflection of the signal from the pipe wall or walls. As an example, if the angle of inclination a is 90°, the signal path is along the axis and the transducers can be spaced an infinite distance apart, where if the angle $\alpha$ is close to zero, the path is in effect orthogonal to the pipe axis and the pairs of transducers must be adjacent one another (i.e. $L \approx 0$). From the above, it is clear that the length L must be correctly set for different pipe diameters and so needs to be adjustable if the probe assembly is to be suitable for use with any pipe diameter. In an alternative (not shown), the probe assembly could comprise a kit having various spacers 15 of fixed length, each spacer suited to a different duct diameter. The adjusters 14a, 14b could then be omitted or may be incorporated only for "fine-tuning" the length L. We may seek protection for a kit having a number of different spacers.

Figure 3:
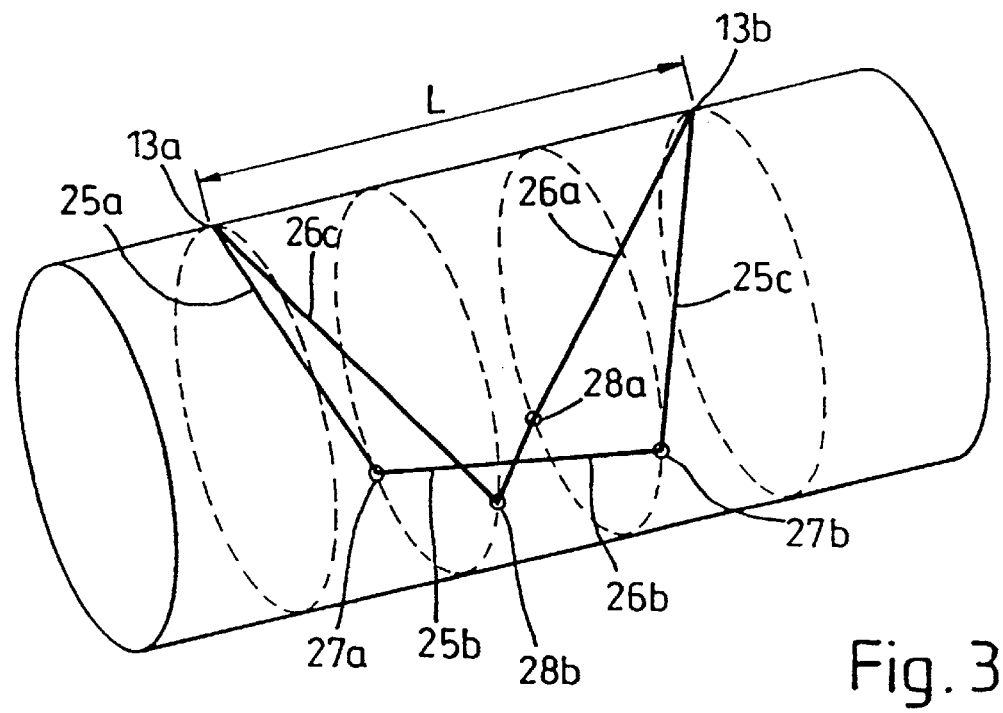
FIG. 3 is a view of ultrasound paths when the device of FIG. 1 is used showing the two acoustic paths along which ultrasonic pulses travel in both directions such that a high degree of insensitivity to disturbed flow profiles is achieved.

In use to obtain flow measurements, the transducers produce short ultrasonic pulses which travel from a first one of the transducer pair 13a along a path 25a,b and c to a first one of the transducer pair 13b. A second one of the transducer pair 13a transmits short ultrasonic pulses along a different path 26c, b and a to the remaining transducer of pair 13b. This is shown in FIG. 3. Similarly, ultrasonic pulses are transmitted from the transducers of the pair 13b along the same paths but in opposite directions, i.e. along 25c,b and a and 26a,b and c. Reflection for each path occurs on the wall of the duct at points 27a,b and 28a,b respectively.

Figure 4:
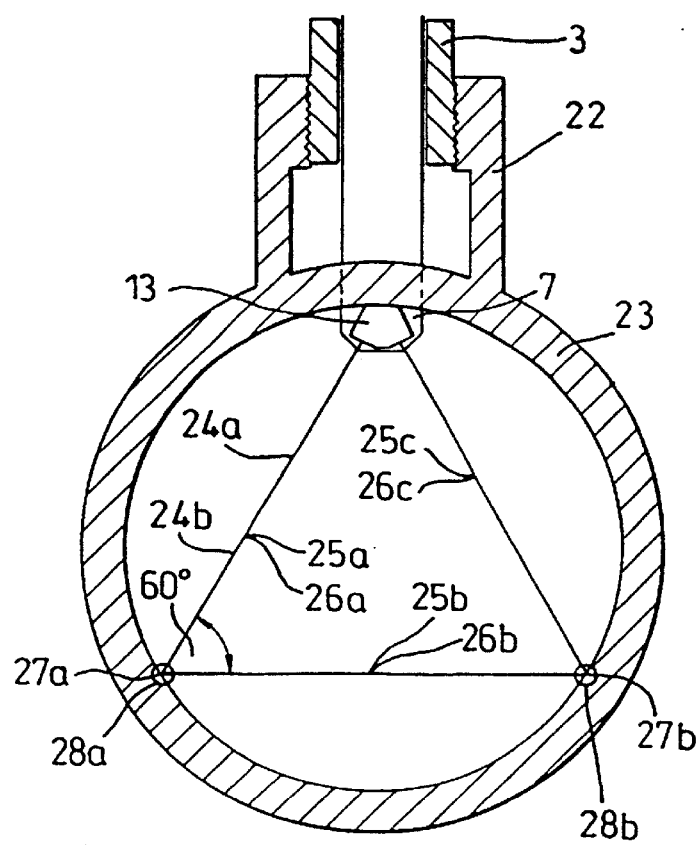
FIG. 4 is a cross-section normal to the axis of the pipe showing the two acoustic paths of FIG. 3 and the position of the probe assembly in use.
Figure 2A:
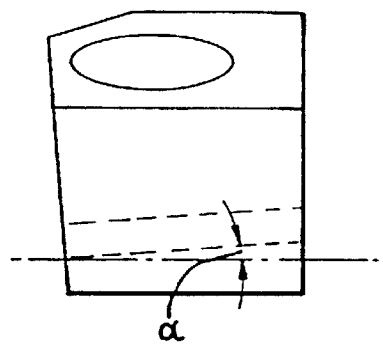
FIGS. 2a–2d are views of the transducers and their mounting arrangement for the probe assembly.
Figure 2B:
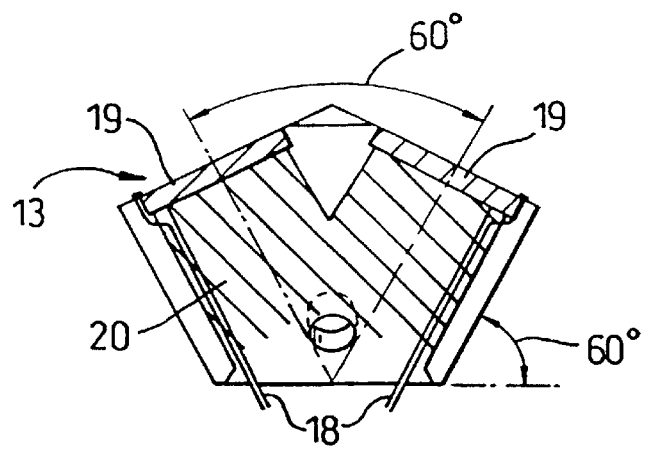
Figure 2D:
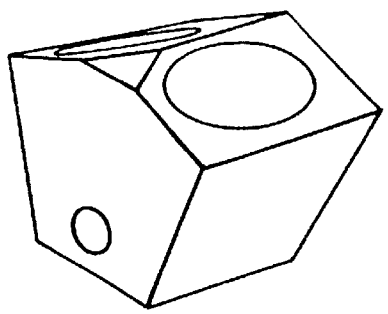
Figure 2C:
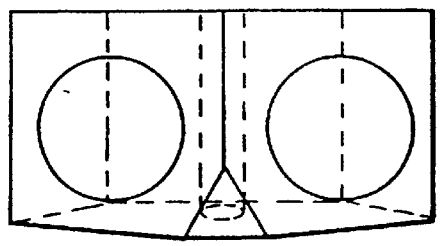

The choice of path is determined by the angle of orientation of the transducers, and preferably an angle of 60° as shown in FIG. 2c and FIG. 4 is used which results in two reflections from the duct wall for each transmission path, as in FIG. 3. This geometry has been shown to be advantageous as it is highly insensitive to the profile of the flow of fluid. Additionally, the two paths 25 and 26 are chosen to be complementary, with one path producing a transit time which is dependent on right hand swirl, and the other producing a transit time which is dependent on left hand swirl. Therefore, by combining the transit times from the two paths, the effect of swirl can be substantially eliminated. It will, however, be readily understood that although an angle of 60° is shown in the Figures, this is only a preferred angle of inclination and any one of a number of other possible transducer arrangements could be employed i.e. 90° which would result in 3 or perhaps 6 reflections for each path.

To calculate the flow rate from the transit times along each transmission path, the difference between the transit times in the directions along the paths 25,26 in the forward and reverse times can be used. An approximately proportional relationship exists between transit time and flow, and so relatively simple electronic circuitry can be employed to extract flow data. In fact, a standard electronic transmitting and receiving device can be used, connected to the transducers via wires 18 which pass through the rod 1 and are sealed by adhesive 20. The electronics can be connected after the probe is inserted.

An important benefit of the invention is that measurement is taken along a complete path, as opposed to a single point measurement. Therefore, an amount of integration of the signal is inherently present, which provides a more accurate indication of flow rate than single point measurements. Also, there is no need to make measurements at different points, which simplifies the operation, i.e. the probe does not need to be moved.

In addition to measuring the flow, the probe assembly in accordance with the present invention can also be used to obtain a measurement of swirl in the pipe. Instead of comparing the forward and reverse transit times, the transit times for each of the two different paths can be compared which produces an output indicative of the swirl of the fluid.

Another beneficial feature of the invention is that a relationship exists between internal diameter of the duct and the transit times, T, which can be used to provide a refined value of duct diameter. This relationship is:

$$D \approx 2((c^2T^2-L^2)/27)^{1/2}+\delta$$

where c is the speed of sound in the fluid and $\delta$ is a correction factor dependent of the size of the transducer mountings 13. Hence, if an independent measurement of c is available, an improved measurement of internal diameter can be made compared with measurements obtained using a measuring rod as is the current state of the art. This may be another aspect of the invention.

It is also possible to use the transit times to fine-tune the probe alignment along the duct axis. Generally, for the arrangement shown in FIG. 1, the probe assembly is correctly aligned when the transit times of the two paths are the same to the order of a few $\mu s$. Manually twisting the handle 5 until the two transit times of the two paths are the same ensures correct orientation (before the ring 6 is used to lock the device).

Figure 7:
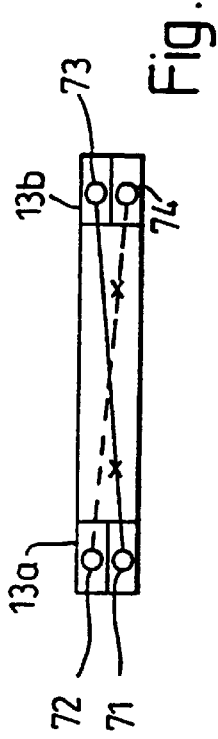
FIG. 7 is a view on arrow VII of FIG. 1b.

FIG. 7 shows schematically the probe means 101 having its four piezoelectric transducers, referenced 71, 72, 73, 74, and showing schematically the two different flight paths, and the fact that the diagonally opposite transducers 72 and 74 are one emitter/receiver pair, and the other diagonally opposite transducers 71, 73 are the other emitter/receiver pair. Each transducer acts as both an emitter and a receiver at different times in order to get a forward and reverse transit time for each of the two paths.

Figure 5A:
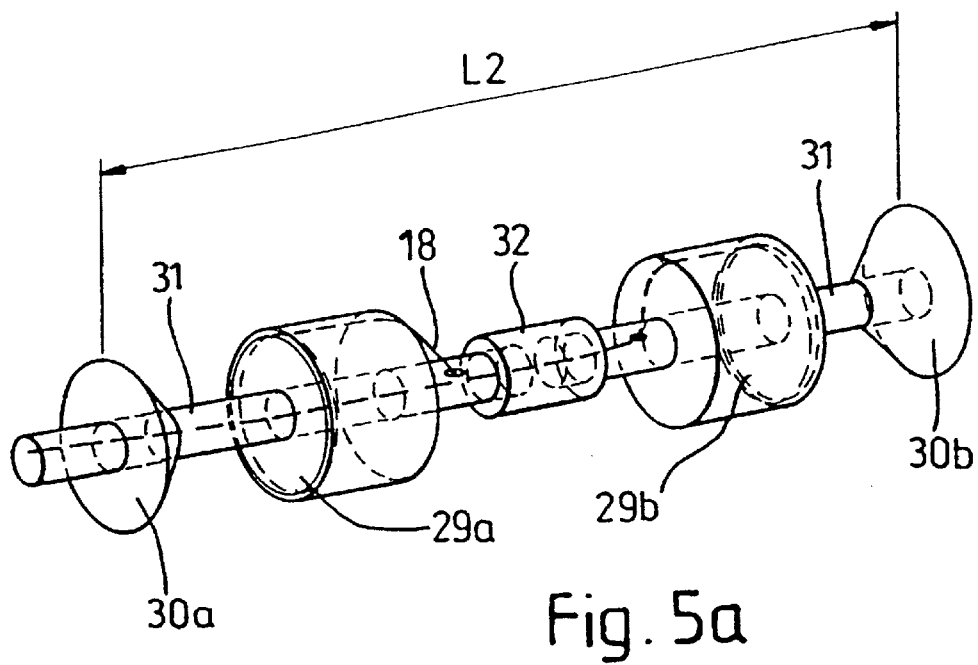
FIG. 5(a) is a first view of an alternative probe assembly in accordance with the present invention which produces a different distribution of acoustic paths.

FIG. 5a illustrates a second embodiment of a probe assembly which can be mounted on the end of the insertion device described hereinbefore. Again, the probe assembly has been designed to be rotated after it is inserted into the duct through the opening so that it is aligned with the axis of the duct.

Figure 5B:
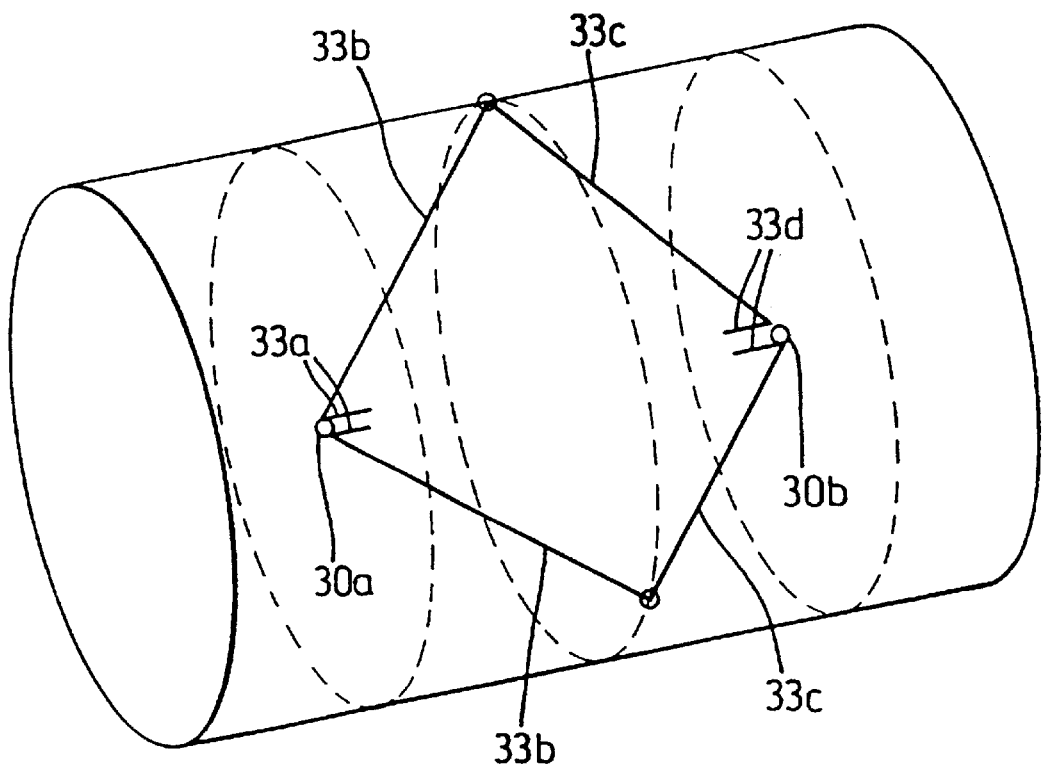
FIG. 5(b) is a second view of the alternative probe assembly shown in FIG. 5(a)

The probe assembly comprises first and second annular piezo-ceramic transducers 29a and 29b and a pair of conic reflectors 30a and 30b. A rod 31 rigidly supports the transducers back to back at a point midway along its length so that the transducers transmit and receive signals in opposing directions along the axis of the duct. A conic reflector is provided at each end of the rod 31 adjacent a respective transducer. Each reflector is orientated so that a signal transmitted from a respective transducer is reflected backwards along and radially outwards from the axis of the duct, to strike the wall of the duct and be directed towards the opposing conic reflector which directs the signal onto the opposing transducer. Reflection of the pulses occurs around a ring on the duct wall. This is shown in FIG. 5b. In this embodiment, the spacing L2 between the conic reflectors is dependent upon the duct diameter.

This embodiment differs from the first embodiment in that the central rod 31 must lie on the central axis of the duct, whereas the first embodiment can be drawn up against a wall, assisting in having a well known and repeatable measuring position. The surface area providing resistance to flow of the second embodiment is therefore greater than the first. However, because it is not necessary to move the probe during testing, the surface area remains constant and so it is not necessary to make complicated corrections as would be required where multiple single point measurements must be taken, moving the sensor between readings, resulting in a variable surface area as the probe moves.

To ensure correct alignment of the probe, the amplitude of the output signals from the transducers can be studied, as it has been found that at the correct orientation the amplitude reaches a maximum. It is thought that this is because as the rod 31 moves off-axis, destructive interference occurs which reduces signal amplitude. As for the first embodiment, flow rate is measured by comparing forward and reverse transit times of ultrasonic pulses, with the difference being substantially proportional to the flow rate. In another embodiment (not shown), the first and second transducers may be held in a cage as opposed to being arranged around a rod 31. This allows many different shapes and arrangements of transducers to be used.

Figure 6:
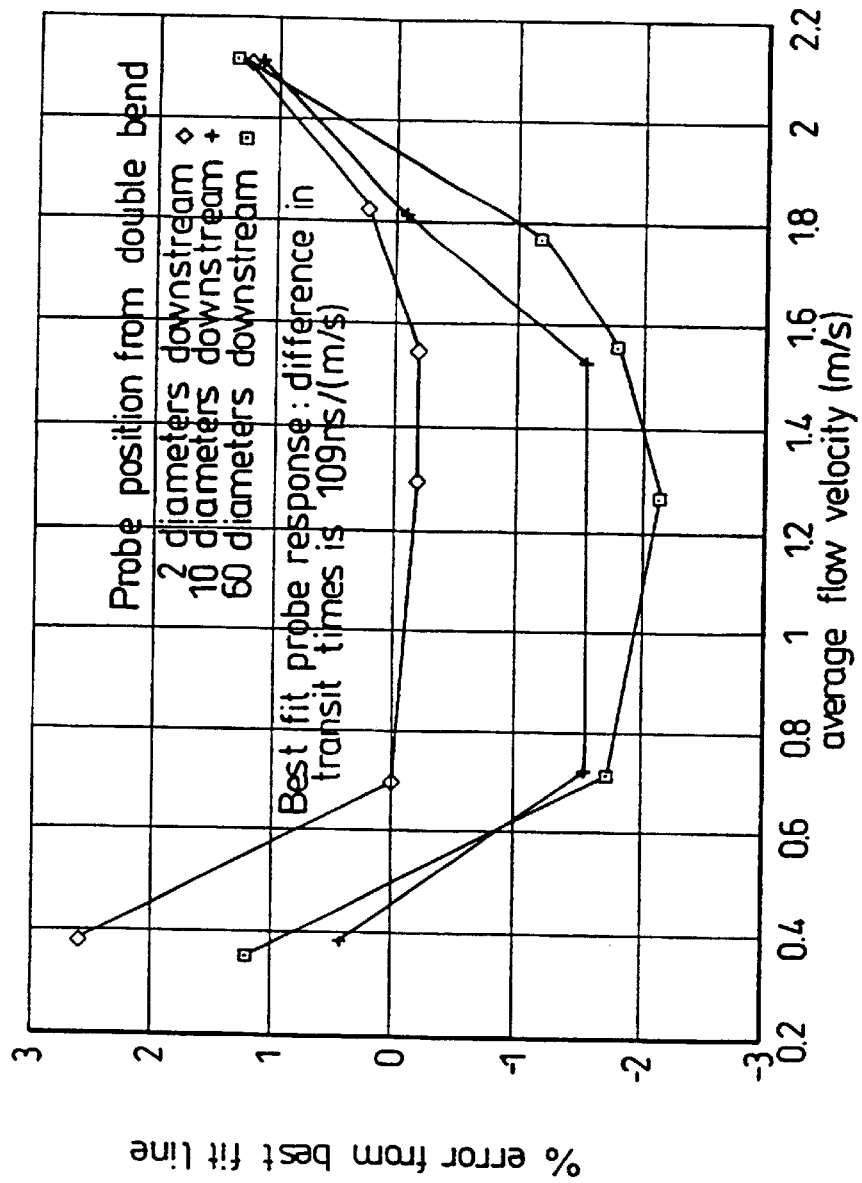
FIG. 6 is a graph showing the response of the probe to fluid flows when it is installed in a 150 mm pipe at 2×, 10× and 60× diameters downstream of a double bend.

FIG. 6 illustrates a typical set of results obtained using an ultrasonic flow measuring assembly in accordance with the invention. The assembly was positioned with the probe on the inside of a 150 mm diameter pipe at distances of 2×diameter, 10× and 60× the pipe diameter downstream from a double bend (in two orthogonal planes) (which is known to provide a highly turbulent flow). The response is shown in terms of a percentage deviation from the least squares best fit line through all measurements at various flow rates. An accuracy of approximately 2 percent can be obtained as shown in the graph despite the high level of turbulence.

To summarise, we provide an ultrasonic probe which can be inserted into a duct to measure the flow of fluid. The probe can be tailored to varying duct sizes, and operates regardless of duct material and surface condition. It also allows measurements from a single fixed point to be taken, which de-skills the use of the probe. The embodiments described are well suited to use in circular pipes or other shaped ducts, and may even be useful in open channels not fully enclosed by walls.

It will be readily understood that whilst the invention has been described in terms of an insertion measuring apparatus which can be used to provide a calibration of a permanently installed flow meter, the invention has many more suitable applications. Indeed, any application in which it is desired to measure the flow of fluid. It is stated here for the avoidance of doubt that the insertion flow measuring apparatus could be employed as a permanent meter which can be retrofitted into a pipe. For example, a boss valve could be welded in place after the fluid duct has been installed, and the flow meter permanently inserted into the pipe. Also, it will be understood that the invention may find application in monitoring the flow of fluid in an open channel whereby it could be floated on the channel surface, or moulded to a suitable support either within or adjacent the flowing fluid. Also, it is intended to provide a broad meaning to the word fluid so as to specifically include at least liquids and gases. One preferred use is in water pipes.

The angle of the transducer beams relative to the top wall of the pipe/axis of the duct is about 20°. This gives us a long separation of transducers consistent with being able to get the probe into the pipe.

The first embodiment has no destructive interference, which can help avoid falsely low signals. On the other hand the symmetry of the second embodiment means that all of the flow is interrogated, instead of just where the two "beams" sweep out. Of course more than two "beams" paths could be used.

The transducers might be segmented transducers.

What is claimed is:

1. An ultrasonic insertion flow meter, comprising a probe for insertion into a duct, the probe having ultrasound transducers and being arranged to perform at a single site of introduction into the duct a first ultrasonic path interrogation having a component of travel of ultrasound in a first axial direction relative to a region of the duct where the probe is inserted and to perform a second ultrasound path interrogation having a component of travel of ultrasound in a second axial direction opposite to the first axial direction, the transducers being arranged such that a comparison of a signal associated with ultrasound travel in the first axial direction with a signal associated with ultrasound travel in the second axial direction enables the flow rate of fluid in the duct to be estimated, said ultrasonic transducers including a first spaced-apart emitter and receiver pair and a second spaced-apart emitter and receiver pair, and variable spacing means for altering the spacing between the emitters and their respective receivers.

2. An ultrasonic insertion flow meter according to claim 1 further comprising signal processing means for processing output signals from the transducers and for monitoring transit times for ultrasonic signals passing along the first and second ultrasound paths.

3. An ultrasonic insertion flow meter according to claim 2 wherein the signal processing means compares the transit times of signals passing in forward and reverse directions along the duct.

4. An ultrasonic insertion flow meter according to claim 3 wherein the probe measures the transit time difference of an ultrasonic pulse in the forward and reverse directions of the first interrogation path and also the transit time difference in the forward and reverse directions of the second interrogation path.

5. An ultrasonic insertion flow meter according to claim 1 wherein the transducers include at least one ultrasound emitter and one ultrasound detector.

6. An ultrasonic insertion flow meter according to claim 1 wherein the ultrasonic transducers include at least one transducer which can act as an emitter and a detector.

7. An ultrasonic insertion flow meter according to claim 1 wherein at least one of said ultrasonic transducers is provided on a first transducer mounting and at least one of said ultrasonic transducers is provided on a second transducer mounting spaced apart from the first transducer mounting so that the first and second pairs of transducers may communicate along said first and second interrogation paths.

8. An ultrasonic insertion flow meter according to claim 1 wherein the insertion flow meter uses at least one reflection of ultrasound off a side wall of the duct to perform at least one of the ultrasonic path interrogations.

9. An ultrasonic insertion flow meter according to claim 1 wherein the ultrasonic paths are beams of ultrasound.

10. An ultrasonic insertion flow meter according to claim 1 wherein the insertion flow meter performs the first and second ultrasonic path interrogations while the insertion flow meter is stationary.

11. An ultrasonic insertion flow meter according to claim 1 wherein the duct has a central longitudinal axis, the first emitter/receiver pair is configured to be spaced axially of the duct in use in a direction parallel to the central longitudinal axis of the duct and the second emitter/receiver pair is configured to be spaced axially of the duct in use in a direction that is parallel to the central longitudinal axis of the duct.

12. An ultrasonic insertion flow meter according to claim 5 wherein the ultrasound emitter is configured to be adjacent a wall of the duct in use.

13. An ultrasonic insertion flow meter according to claim 5 wherein the ultrasound detector is configured to be adjacent a wall of the duct in use.

14. An ultrasonic insertion flow meter according to claim 1 wherein the duct has a first wall region, each receiver and each emitter are configured to be adjacent said first wall region and in which the emitter/receiver of the first pair is spaced emitter-to-receiver in one axial direction and the emitter/receiver of the second pair is spaced emitter-to-receiver in the opposite direction.

15. An ultrasonic insertion flow meter according to claim 9 wherein a first beam of ultrasound when viewed along an axis of the duct in a direction has reflections having a clockwise sense of rotation about the axis, and a second beam when viewed along the axis and the direction has reflections in an anticlockwise sense of rotation about the axis.

16. An ultrasonic flow meter according to claim 1 further comprising an insertion device supporting the probe for movement in use relative to the duct between a first position in which said probe can be inserted into the duct and a second position in which flow measurements can be made.

17. An ultrasonic insertion flow meter according to claim 16 wherein the probe has a greater dimension parallel to an axis of the duct in its second position than it does in its first position.

18. An ultrasonic insertion flow meter according to claim 16 wherein in the first position the probe is oriented so that the first and second emitter and receiver pairs are spaced apart substantially orthogonal to the axis of the duct and in the second position the probe is oriented so that the first and second emitter and receiver pairs are spaced apart substantially axially along the duct.

19. An ultrasonic insertion flow meter according to claim 16 wherein the probe is supported on the insertion device to swing from its first position to its second position.

20. An ultrasonic insertion flow meter according to claim 16 wherein the probe is hingedly attached to the insertion device so that the probe can be moved angularly between the first position and the second position.

21. An ultrasonic insertion flow meter according to claim 20 wherein the probe is joined by a hinge to the insertion device.

22. An ultrasonic insertion flow meter according to claim 16 wherein the transducers are arranged so that in the second position of the probe, the signals along each path are reflected twice from the wall of the duct, so that, when viewed along the axis of the duct, an angle of about 60 degrees is subtended between signals incident upon and signals reflected from a point of reflection.

23. An ultrasonic insertion flow meter according to claim 1 wherein the probe comprises first and second transducers which are mounted back to back between and spaced apart from a pair of spaced-apart conic reflectors which reflect signals from the first transducer to the second transducer and signals from the second transducer to the first transducer.

24. An ultrasonic insertion flow meter according to claim 23 wherein the spacing of the reflectors relative to the transducers is adjustable.

25. An ultrasonic flow meter according to claim 23 wherein the spacing between the reflectors and the transducers is fixed.

26. A method of measuring the flow rate of a fluid in a duct having a diameter and a longitudinal axis, comprising the steps of providing an insertion flow meter having spaced-apart transducers; adjusting the spacing of the transducers in accordance with the diameter of the duct; inserting the insertion flow meter into the duct; conducting a forward direction ultrasonic transit time test with a component of travel of an ultrasound signal in an axial direction of flow of the fluid in the duct; conducting a reverse direction ultrasonic transit time test with a component of travel of an ultrasound signal in a direction opposite to the axial direction of flow of fluid in the duct; and comparing the results of the forward and reverse transit time tests to give a result indicative of the fluid flow rate.

27. The method according to claim 26 wherein the steps of conducting the forward test and the reverse test are conducted between a pair of transducers which act as emitter/receiver for the forward test and receiver/emitter for the reverse test.

28. The method according to claim 26 further comprising the steps of conducting a second forward direction test performed along a different ultrasound travel path than the first forward direction test, and comparing the result from the second test with that of the first travel path test to give a figure indicative of swirl of the fluid in the duct.

29. The method according to claim 26 wherein the steps of conducting the transit time tests are conducted with the transducers stationary.

30. The method according to claim 29 wherein the steps of conducting the transit time tests are conducted with the transducers adjacent a wall of the duct.

31. The method according to claim 26 further comprising the steps of moving the transducers in the duct after each of a succession of transit time tests, comparing the results of the succession of tests, and moving the transducers to a selected position in which one of a desired signal and or a comparison of signals is received.

32. The method according to claim 26 wherein the transducers are provided on a probe, the insertion step comprises the steps of inserting the probe into the duct with the probe having a smaller projected length axially of the duct in comparison to its length axially of the duct in a position of use, and moving the probe to the position of use prior to conducting the tests.

33. The method according to claim 26 wherein the insertion flow meter includes an ultrasonic probe having at least one first ultrasonic transducer and at least one second ultrasonic transducer spaced apart from the first transducer, the insertion step comprises the steps of placing the first and second transducers in a first position in which they are spaced apart substantially orthogonal to the duct axis and thereafter moving the probe from the first position to a second position in which the first and second transducers are spaced apart substantially along an axis of the duct, the steps of the transit time tests are conducted for pulses of ultrasound transmitted between the first and second transducers along one or more paths, and the comparing step comprises comparing the transit times for pulses propagating between the first and the second transducers to transit times for pulses propagating between the second and the first transducers to obtain a result indicative of the rate of flow of fluid in the duct.

34. The method according to claim 33 wherein the step of moving the probe between the first and second positions comprises rotating the probe between the first and second positions.

35. The method according to claim 26 wherein the step of providing an insertion flow meter comprises providing a pair of first transducers and a pair of second transducers on said insertion flow meter.

36. The method according to claim 35 wherein the step of providing the first and second pairs of transducers on said insertion flow meter comprises providing said first and second pairs of transducers such that they communicate along two different paths.

37. The method according to claim 26 wherein the insertion step comprises moving the transducers into contact with the surface of the duct adjacent an entry hole in the duct through which the transducers are inserted.

38. The method according to claim 26 further comprising the step of comparing transit times for signals propagating along each of two paths in order to measure the swirl of fluid in the duct.

39. The method according to claim 26 further comprising the step of monitoring one of a transit time and a signal amplitude, which is dependent on duct internal diameter and speed of sound in the fluid, in order to obtain accurate data indicative of the duct diameter and of transducer alignment.

40. A method of checking a fixed flow meter in a conduit comprising the steps of providing an ultrasonic insertion flow meter having a probe adapted to be inserted into a duct, the probe having ultrasound transducers and being operable to perform at a single site of introduction into the duct a first ultrasonic path interrogation having a component of travel of ultrasound in a first axial direction relative to a region of the duct where the probe is inserted and also to perform a second ultrasound path interrogation having a component of travel of ultrasound in a second axial direction opposite to the first axial direction, the transducers being arranged such that a comparison of a signal associated with ultrasound travel in the first axial direction with a signal associated with ultrasound travel in the second axial direction enables the flow rate of fluid in the duct to be estimated, said ultrasonic transducers including a first emitter and receiver pair spaced apart by a variable spacing and a second emitter and receiver pair which are spaced apart by a variable spacing, varying the spacing between the emitters and their respective receivers, determining a rate of flow of fluid in the conduit using the insertion flow meter, and comparing the rate of flow of fluid determined using the insertion flow meter with rate of flow of fluid measured using the fixed flow meter.

41. A method of measuring the flow rate of a fluid in a duct, comprising the steps of inserting an insertion flow meter into a duct; conducting a first forward direction ultrasonic transit time test with a component of travel of the ultrasound in an axial direction of flow of the fluid in the duct; conducting a first reverse direction ultrasonic transit time test with a component of travel of the ultrasound in a direction opposite to the axial direction of flow of fluid in the duct; comparing the results of the forward and reverse transit time tests to give a result indicative of the fluid flow rate; conducting at least one of a second forward direction test and a second reverse direction test along a different ultrasound travel path than the first forward direction and reverse direction tests; comparing a result from said at least one of a second forward direction test and a second reverse direction test with the results of the first travel path tests to obtain a result indicative of swirl of the fluid in the duct, comparing a transit time for signals along the first travel path with a transit time for signals along the second travel path, and adjusting the alignment of the insertion flow meter in the duct until the transit times of the two paths are the same to the order of a few microseconds so as to fine-tune the alignment of the insertion flow meter along the duct axis.

* * * * *

UNITED STATES PATENT AND TRADEMARK OFFICE
CERTIFICATE OF CORRECTION

PATENT NO. : 6,345,539 B1
DATED : February 12, 2002
INVENTOR(S) : Rawes et al.

It is certified that error appears in the above-identified patent and that said Letters Patent is hereby corrected as shown below:

Column 1,
Line 10, "common place" should read -- commonplace --
Line 13, "companies" should read -- companies' --

Column 2,
Line 21, "effected" should read -- affected --
Line 49, "man" should read -- many --
Line 50, "effects" should read -- affects --
Line 50, "i s" should read -- is --
Line 65, "said" should read -- said other --

Column 8,
Line 8, "a" should read -- α --
Line 51, "3" should read -- 3 --

Column 9,
Line 16, "D≈2(($c^2T^2-L^2$)/27)½+δ" should read -- D≈2(($c^2T^2-L^2$)/27)$^{½}$+δ --

Column 10,
Line 31, "2" should read -- 2 --

Signed and Sealed this

Tenth Day of September, 2002

Attest:

JAMES E. ROGAN
Attesting Officer       Director of the United States Patent and Trademark Office